March 13, 1945. P. L. KIRK ET AL 2,371,176
MEANS FOR AND METHOD OF DETECTING FLAWS IN PIPES AND THE LIKE
Filed Feb. 24, 1941 3 Sheets-Sheet 1

INVENTORS
PAUL L. KIRK
ROBERT Q. BOYER
BY
William E. Hall
ATTORNEY

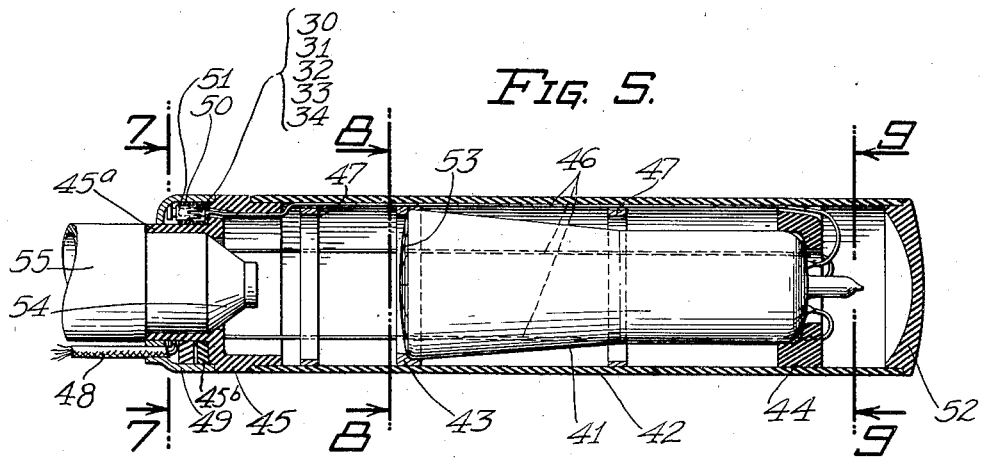
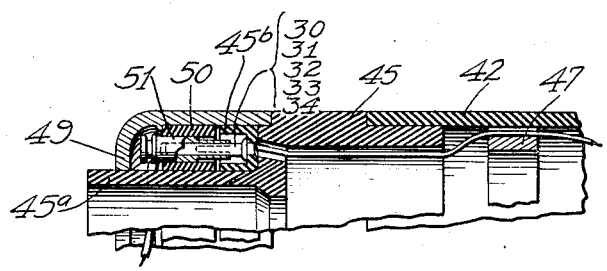
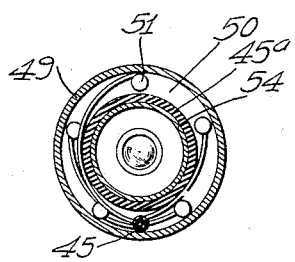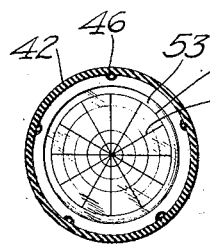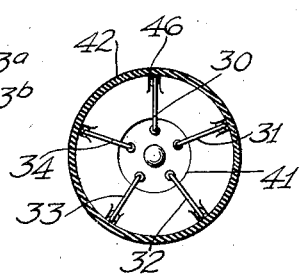

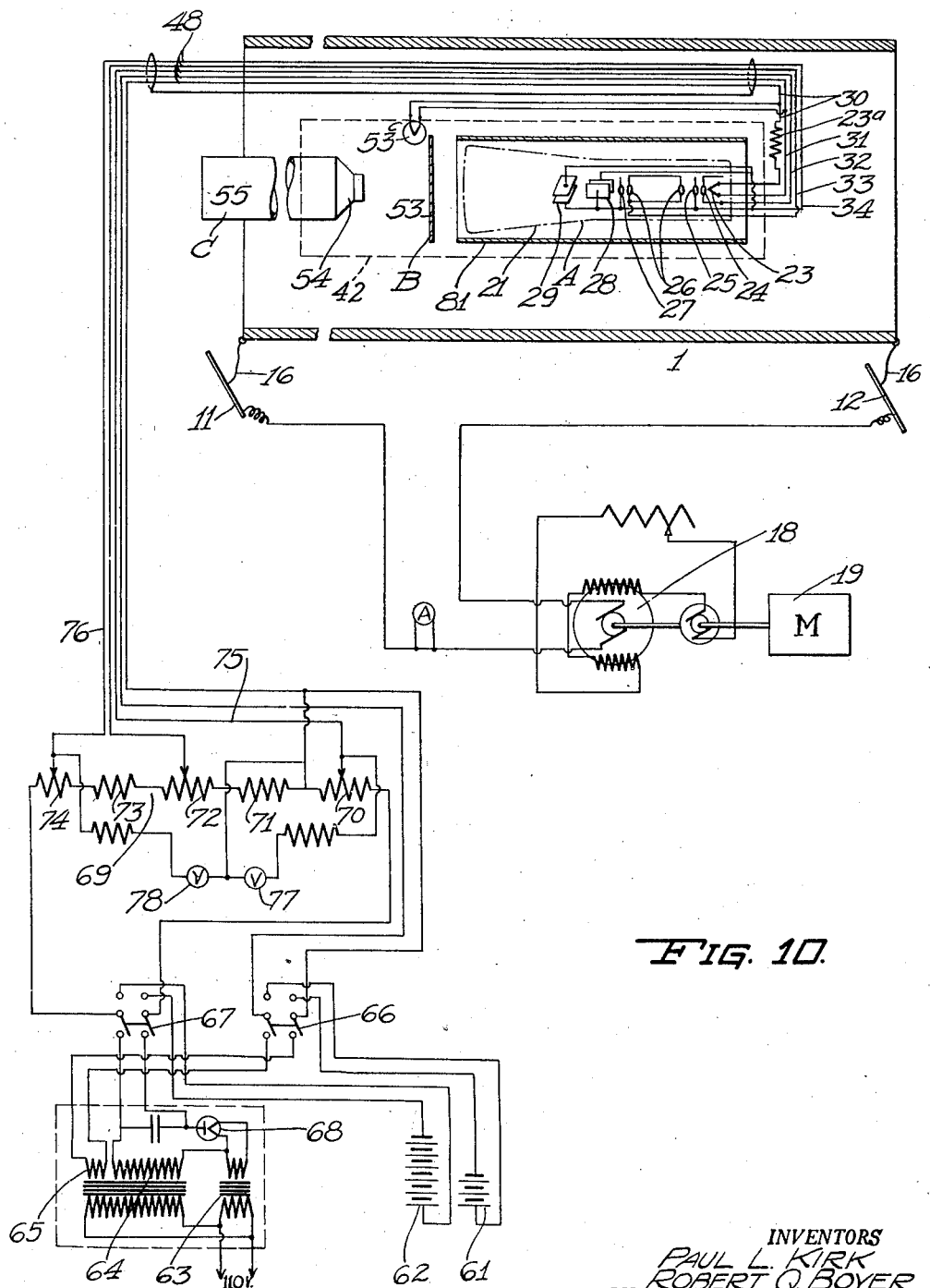

Patented Mar. 13, 1945

2,371,176

UNITED STATES PATENT OFFICE 2,371,176

MEANS FOR AND METHOD OF DETECTING FLAWS IN PIPES AND THE LIKE

Paul L. Kirk and Robert Q. Boyer, Berkeley, Calif., assignors to Ventura Tool Company, Ventura, Calif.

Application February 24, 1941, Serial No. 380,136

17 Claims. (Cl. 175—183)

Our invention relates to means for detecting, locating, and registering flaws in metal pipes and other tubular conductors, and to a method of detecting such flaws.

One of the principal objects of our invention is to provide a flaw detector of this character which will detect and locate with considerable accuracy a flaw in pipes or other tubular conductors, and which will determine the approximate nature and extent of the flaw.

An important object also of our invention is the provision of a novel method for the detection, location, and determination of the nature and extent of flaws in pipes, a method which is relatively simple and economical to practice, and a method in which the element of error is reduced to a minimum.

The flaws which may be detected, located, and the substantial nature and extent of which may be determined by our invention, are inherent weaknesses of the pipes or tubular conductors. These may be varying wall thicknesses of the pipes arising from imperfect manufacture or from irregular wear during well-drilling operations. Or, they may consist of the presence of discontinuities or flaws arising from slag inclusions during manufacture, mill defects, fatigue, fatigue flaws from periodic overload, corrosion, corrosion fatigue, and the like. Or, they may also consist of pitting, either as single pits or as pitted areas.

The exact meaning of the term "fatigue" with respect to metals is difficult to define except in the most general terms. If a metal is repeatedly put under a high strain or stress, it may eventually be weakened to the point that under a succeeding similar high strain or stress it will fracture. This is the most common conception of fatigue. However, corrosion, flaws caused by improper working of the metal, inclusions, and other such conditions, all characterized as a lack of uniformity in the metal, will predispose to a progressively weakening system. Presumably, this is because the fatigue caused by successive stresses will start to develop around these defective areas. The most generally accepted hypothesis as to the fundamental nature of these fatigued areas is that slip planes—planes in which the cohesive forces are lessened—gradually develop. These may be between crystals, or more characteristically may be normal cleavage planes within the crystals themselves. Such slip planes will not usually show visible separation but do represent a certain discontinuity which will diminish the effective strength of the metal just as though the actual cross sectional area were diminished.

Such areas of incipient fracture, in which inter-crystalline cleavage or intra-crystalline slip planes exist, would be expected to show a number of physical properties which are not identical with those of completely intact metal. One of the most obvious alterations would be in the electrical conductivity, since the effective conducting area is diminished. Another would be the formation of multiple dipoles on magnetization of the material. Still another would be the thermodynamic activity or escaping tendency of the atoms or molecules, due to the alteration of cohesive and intermolecular restraints placed on these particles along the slip planes and interfaces. The latter effect might be demonstrated by a number of procedures dependent on these alterations of activity. Solution pressures would in general be different. It was shown by preliminary electrometric measurements that this property is too erratic to utilize effectively. Changes in the thermodynamic activity would also lead to alterations in the thermoelectric properties. Tests based on this alteration were studied and found to be practical to the extent that fatigued areas could be found and demonstrated provided that they extended to the surface of the metal. This method was slow and laborious, and could not be effectively applied to the testing of pipes.

The use of magnetic properties is the basis for various tests in current use. Magnetic properties have been measured in various of these tests and is known to indicate the existence of variations in structure of metals. Such methods are successful with small and relatively symmetrical and uniform objects made of iron, steel or ferrous alloys. They are not practical for large objects, especially when these are not of uniform shape.

Another method based on magnetic properties is the direct demonstration of the microscopic cracks bounding small individual dipoles by means of suspensions of very fine iron powder, applied to the test object while it is magnetized. This again is a slow method and is only successful when the fatigued area reaches the surface. Its most proper use is for testing small objects.

Consideration of all of these possibilities points most definitely to the use of methods concerned with the flow of electricity through the test material as being the most practical for large scale work with large objects, since these can make use of a property capable of rapid measurement, and obviously most suitable for elongated objects such as steel rails, pipes, etc.

Our instrument or apparatus is a cathode ray tube flaw detector. The object of the instrument or apparatus is to determine the existence, magnitude, direction, and sense of electro-magnetic fields at the inside of pipes or tubular conductors, set up by electric current in the walls of these pipes or tubular conductors when direct current is being passed through. Such flux, caused by irregularities in direction of current flow, are indicative of the aforementioned flaws or conditions which usually may be distinguished from each other by the instrument.

The cathode ray tube flaw detector described here measures non-uniformity in the flow of current through a conductor. It does not, however, require movement of the instrument, but may be used either while moving or stationary. Its size allows it to be introduced in the larger pipes without difficulty, though there is a definite lower limit to the size of pipe to which it can be applied. The movement of electrons in the cathode ray tube detector is accurately registered qualitatively and quantitatively, that is, in direction, sense, and amount, to indicate the nature of the non-uniformity. Thus it can be used for studying such matters as spiral wear.

Principle of the instrument

When a direct current flows through a uniform conductor, a symmetrical and uniform magnetic field is established around the outside of the conductor. If, through some irregularity in the conductor, such as a crack or other flaw, the current flow is impeded, and it will be caused to flow around such an impeding point, thus setting up an unsymmetrical field. Such fields have previously been investigated by magnetic induction methods and other means in connection with solid conductors.

As applied to tubular conductors, the situation is altered by the fact that the interior of a uniform tubular conductor has no magnetic field. If, however, any lack of uniformity arises as a result of any of the above mentioned flaw conditions, a magnetic field is generated on the inside of the tubular conductor through non-uniform distribution of the current. An instrument for indication of the presence of such fields may then be used to detect the presence of such non-uniform condition of the conductor itself.

Such instrument in our invention includes a cathode ray tube as the indicating instrumentality. Within the tube, an electron beam is generated which flows in a straight line to and registers as a spot on a fluorescent screen. If a magnetic field is present in the neighborhood of the tube, the direction of flow of electrons is altered by a force perpendicular to their direction, and in the plane normal to the field. Definite and appropriate mounting and connection of the cathode ray tube must be made, as will be shown in the accompanying drawings and described in the following detailed description. When a field is encountered, when passing the cathode ray tube through the pipe or tubular conductor to be tested, and through which current is passing, a deflection substantially at right angles to the field will be observed. The deflection is measured by linear displacement of the spot on the screen, which displacement is proportional to the intensity of the field encountered; the focussed electron spot on the fluorescent screen will move approximately 3 mm. per gauss of flux. Any such indication by movement of the spot is evidence of irregularity of flow of current in the conductor, and therefore of a flaw or irregularity in the pipe or tubular conductor, and the amount, direction, sense, and continuity of such movement may be used to interpret the type of irregularity (flaw, fatigue, difference in thickness, spiral wear, etc.).

In order that all significant variations and irregularities in the conductor (in this case an oil well drill pipe) will set up a sufficient field to be detected, it is desirable to have direct current flowing in the amount of about 700 to 750 amperes through the conductor. Variations within reasonable limits, and alterations in amount of current made necessary by different types of tubular conductors, are allowable. Alternating current may not be used, partially at least because of the "skin effect," and perhaps partially due to dipolar effects at interfaces within the metal which allow a certain amount of normal conduction across flaws.

Reference will be had to the accompanying drawings which illustrate our invention, in which:

Fig. 5 is a longitudinal section of the flaw detector head, of our apparatus, to be inserted into one end of the pipe to be tested, and showing fragmentarily one end of the objective lens portion connected thereto;

Fig. 6 is an enlarged fragmentary section thereof;

Figure 1:
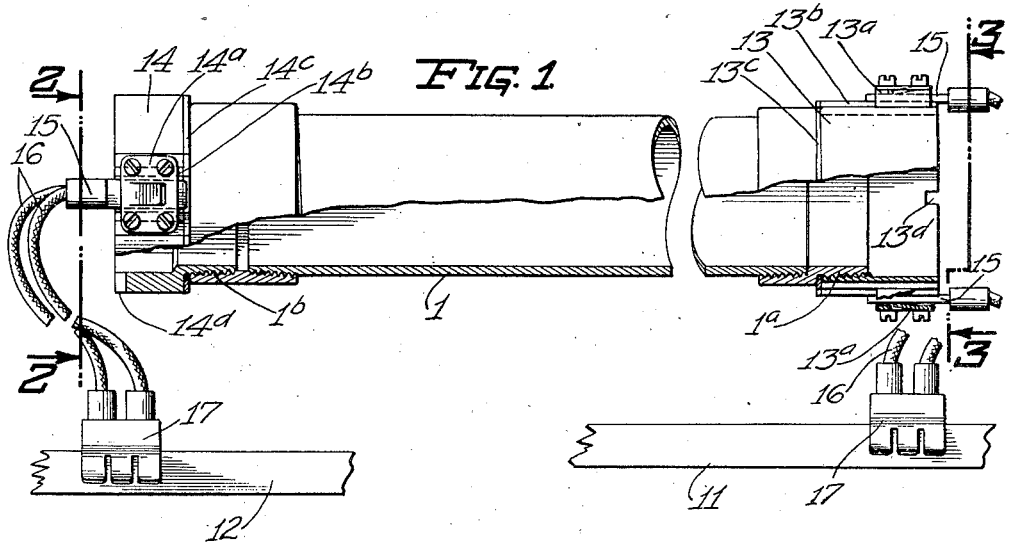
Fig. 1 is a fragmentary longitudinal elevational view of a pipe to be tested and showing the electrical connections of our apparatus, to the opposite ends of the pipe, for electrically charging the same.
Figure 2:
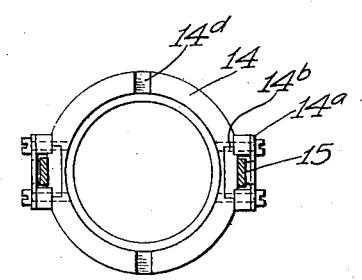
Figs. 2 and 3 are end elevations of the connections for the opposite ends of the pipe, and taken respectively at 2—2 and 3—3 of Fig. 1.
Figure 3:
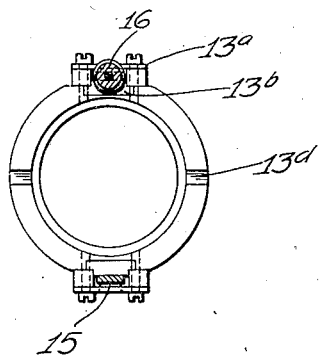
Figure 4:
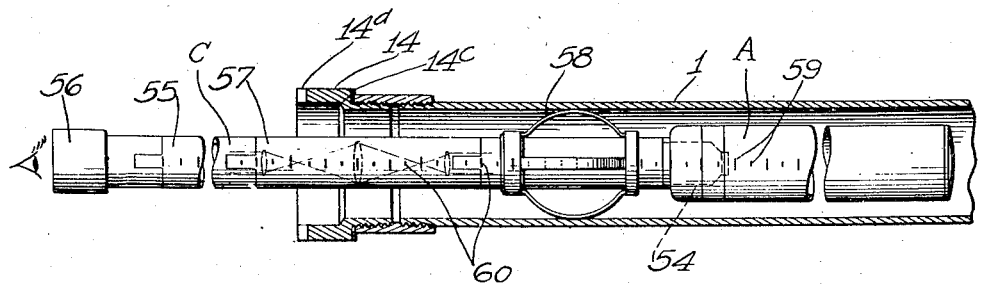
Fig. 4 is a longitudinal sectional view of one end of the pipe to be tested and showing fragmentarily our flaw detector head inserted into one end of the pipe.

Figs. 7, 8, and 9 are transverse sectional views of the detector head, taken respectively through 7—7, 8—8, and 9—9 of Fig. 5; and, Fig. 10 is a wiring diagram of a preferred form of our pipe flaw detector.

Description

Our pipe flaw detector may be used or applied to a pipe for testing the same for defects or flaws in most positions of the pipe, when an end and the interior are open, and when not grounded. Pipe lengths or sections, such as used in oil wells, are often stacked horizontally on racks. These pipes, pipe lengths, or sections, designated 1 in the drawings, when so stacked and when separated or electrically insulated from each other, may be easily tested.

When the pipes or pipe sections are arranged in this manner, a bus bar may be provided at each end of the pipes on the rack, as indicated by 11 and 12. An oil well pipe usually has externally and internally threaded opposite ends 1$^a$ and 1$^b$. On these ends are detachably secured or screwed correspondingly threaded couplings 13 and 14, which are attached to the ends of each of the pipes to be sequentially tested. Each of the couplings has a pair of spring clasps, designated respectively, 13$^a$ and 14$^a$. Each of the clasps is adapted to receive and frictionally but detachably hold a connector 15 at one end of the cables 16.

The spring clasps are provided at the outer sides of copper or brass elements 13$^b$ and 14$^b$, which are inlaid in longitudinal grooves at the diametrically opposite sides of the connectors.

These copper elements are secured at their inner ends to copper or brass rings 13$^c$ and 14$^c$, respectively. The elements and rings are preferably brazed in place. Such elements and rings provide efficient connections and conductors between the conductor cables 16 and the pipe to be tested.

The opposite ends of the cables have fittings 17 which slide on the bus bars 11 and 12, one on each bus bar.

Thus, there is slidably connected the one end of a cable to each bus bar, and the other or free end of each cable is bifurcated or has two connectors, the two connectors of each cable being detachably connected to the opposite sides of each of the couplings 13 and 14. By such connection, the ends of the pipe are wholly open for the free insertion of the flaw detector head of the instrument.

The ends of the couplings 13 and 14 are provided with radial slots 13$^d$ and 14$^d$ to facilitate the securing of the couplings to the ends of the pipe by a suitable spanner wrench.

When operating our apparatus for detecting flaws, the pipe is charged, through the bus bars, with a direct current of 700 to 750 amperes, as stated above. This current may be supplied by a generator, designated 18, operated by an engine 19.

Three important elements of our pipe flaw detector are the detector head A, the screen B, and the telescope C, which will be presently described.

The detector head A consists essentially of a slightly modified or special cathode ray tube 21.

The cathode ray tube used is similar to the one designated Type No. 902, of the R. C. A. series. This tube is provided with the usual tube elements and five electrodes. These tube elements consist of a 6-volt combined heater or filament and cathode 23, grid 24, anodes 25, 26, and 27, and pairs 28 and 29 of deflecting plates. The anodes are classified respectively accelerating (25), focusing (26), and high potential (27) anodes. The electrodes or connectors 30 and 31 are provided for the combined filament and cathode, the electrode or connector 32 for the grid 24, 33 for the anode 26, and 34 for the anodes 25 and 27 and also for the plates 28 and 29. The deflecting plates, it will be noted, are shorted out.

The aforementioned elements are enclosed in a glass envelope 41. The envelope of the cathode ray tube is enclosed and secured in an insulating cylindrical casing 42 which is of a diameter such that it will pass freely through the pipe to be tested. The cathode ray tube is positioned approximately at the middle portion of the casing 42. It is located at its forward end by an annular stop 43, and at its smaller rear or base end by an annular base member 44. It will be here noted that the conventional base, together with the base electrodes or connectors, of the cathode ray tube is removed from the base end of the tube, and the annular base 44 substituted therefor. This annular base 44 is preferably of Bakelite or other insulating material. The stop or ring 43 may be made of brass. The stop 43 and the base 44 are secured in any suitable manner so that the tube may be readily removed. At the forward end of the cylinder 42 is provided a head member 45 which forms the base for the electrodes above mentioned. This head member is shown as made of insulating material but, in some instances, it is preferably made of brass. The lead wires, designated 46, extend from the terminals at the base end of the cathode ray tube to the connectors 30, 31, 32, 33, and 34, mounted in an insulating ring 45$^b$ which is pressed around a cylindrical flange 45$^a$ at the outer end of the head 45; the lead wires extend along the inside wall of the cylindrical casing and are held outwardly by annular wire spreaders 47.

The electrical energy for the cathode ray tube is supplied through a shielded conductor cable 48 which extends into a cap 49 adapted to fit over the head or forward end of the cylindrical casing. In the cap 49 is provided a terminal block 50 which may be pressed into place. In this block are mounted sockets 51 for receiving the aforementioned connectors.

The opposite or rear end of the cylindrical casing 42 is provided with a cap 52.

The forward end of the cathode ray tube is provided with a conventional fluorescent screen 53, referred to above as B, for receiving the image of the electron stream.

The connector supporting base 45 has an axial opening enclosed by the cylindrical flange 45$^a$, referred to above; around this flange is positioned the cap 49. This cylindrical flange or neck 45$^a$ receives and locates the objective 54, of the telescope 55, referred to above in general terms as C. The objective 54 may be screwed or otherwise secured in the flange 45$^a$. Thus, the tube, screen, and objective of the telescope are in substantial axial alinement, and move as a unit.

The device 55, which we have referred to as a telescope, may be similar to the commercially known Tuboscope or Boroscope. As shown, it consists of an objective at one end, shown in the drawings as 54, an eyepiece 56 at its opposite or outer end, and intermediate tubular members or telescope sections 57. The objective 54 is placed at the position of maximum visibility and focus with relation to the screen 53. The intermediate tubular members 57 may be approximately six feet long, and may all be of identical construction, all having a series of axial lenses so that the image received at the objective end is identically reproduced at the eyepiece or opposite end.

In order to view at the eyepiece, which is always located beyond one end of the pipe to be tested, the condition of the pipe at any point therein, telescope sections 57 are inserted between the objective and the eyepiece, the number of such sections to be inserted being determined by the particular portion of the pipe to be tested. Thus, many such sections 57 may be inserted between the objective and the eyepiece when the flaw detector head is to be inserted into a long pipe.

On the telescope, and preferably near the objective 54, is provided a radially collapsible and resilient basket 58, for centering the flaw detector head within the pipe. Such basket may consist of circumferentially spaced bowed springs.

The flaw detector head casing and the telescope, including all portions of the latter, may be provided with longitudinal graduations 59 and 60, respectively, for determining the extent of the linear insertion of the flaw detector head within the pipe.

The electrical energy of our flaw detector may be supplied from a series of batteries 61 and 62, and also from a 110-volt A. C. line through transformers 63, 64, and 65. The battery 61 supplies a 6-volt current to the filament and cathode 23, or the same may be energized through the transformer 65, a double pole switch 66 being provided to shift the source of energy from one to the other. A 12-volt lamp 53c, to illuminate the screen 53 at the objective side thereof, is connected in multiple with the filament and cathode 23, a resistor 23ª being provided in the circuit of the latter in order to reduce the voltage for the filament and cathode to 6 volts. The grid 24 is supplied from the battery 62 or from the transformer 64, depending upon the position of the double pole switch 67. The anodes 26, the anodes 25 and 27, and the plates 28 and 29 are also energized by the same sources. But all elements connected to the battery 62 or the transformer 64 are provided with different resistors in their respective circuits. The transformer 63 supplies energy only to the filament of the rectifier tube 68, as in the conventional construction; and across the leads from the transformer 64, one of which is through the rectifier tube 68, is connected a condenser of 8 mfd. Across the leads from the battery 62, or transformer 64, is connected a potentiometer in which are provided a series of resistances or resistors 70, 71, 72, 73, and 74, above mentioned, the two former being of 15,000 ohms, the third of 25,000 ohms, and the two latter of 50,000 ohms each. In the bleeder circuits 75 and 76, for the grid 24, and for the anodes 25 and 27 and the deflecting plates 28 and 29, are connected volt meters 77 and 78 to facilitate the focusing of the electron beam without observation of the tube, by the establishment of the necessary voltages in the bleeder circuits.

In order to reduce the sensitivity of the cathode ray tube A of the detector head, the ordinary length of the tube may be considerably reduced, or auxiliary means may be provided to effect such result. One of such means may be the provision of an iron or similar cylinder 81 around the tube elements, as shown in Fig. 10.

*Operation*

When the couplings 13 and 14 are connected to the ends of the pipe to be tested, and such couplings connected to the bus bars 11 and 12, as pointed out above, the pipe is charged with a current of 700 to 750 amperes D. C. current. The electron beam of the cathode ray tube is focussed by setting the potentials in the bleeder circuit. The detector head, and objective end of the telescope, are then inserted into an open end of the pipe to be tested, and are moved therethrough. The operator may then observe, from the eyepiece, the movement of the image or spot on the screen, due to the deflections of the electron beam caused by the magnetic flux at points in the pipe having flaws.

It will be here noted that the screen may be provided with graduated concentric circles 53ª and with angularly graduated radius lines 53b. The magnitude and direction or sense of the deflection of the image or spot on the screen is then noted. At the same time, the position of the flaw detector within the pipe is noted or measured by means of the graduations 59 and 60 on the detector head and telescope. These readings are recorded and the determination of the condition of the pipe made from such observation.

Though we have shown and described a particular construction, combination, and arrangement of parts and portions of an apparatus for detecting flaws in pipes, and a particular method of determining the same, we do not wish to be limited by such disclosures, but desire to include in the scope of our invention the construction, combination, and arrangement of parts and portions of our apparatus and steps in our method, substantially as set forth in the appended claims.

We claim:

1. In a cathode-ray pipe-flaw detector for testing a pipe which is temporarily electrically energized, means for passing an electric current longitudinally through the pipe, a cathode ray tube inserted into an open end of the pipe and movable longitudinally therein, and means for determining deflection of the electron stream of the tube while the latter is within the pipe.

2. In a cathode-ray pipe-flaw detector for testing a pipe which is temporarily electrically energized, means for passing an electric current longitudinally through the pipe, a cathode ray tube inserted into an open end of the pipe and movable longitudinally therein, and a screen for the tube and movable therewith through the pipe, said screen having radial and angular measuring units.

3. In a cathode-ray pipe-flaw detector for testing a pipe which is temporarily electrically energized, means for passing an electric current longitudinally through the pipe, a cathode ray tube inserted into an open end of the pipe, means for moving the tube longitudinally therethrough, and a telescope having an eyepiece arranged to remain beyond one end of the pipe to be tested for determining the deflection of the electron stream of the tube while the latter is within and moved through the pipe.

4. In a cathode-ray pipe-flaw detector for testing a pipe which is temporarily electrically energized, means for passing an electric current longitudinally through the pipe, a cathode ray tube inserted into an open end of the pipe, means for moving the tube longitudinally therethrough, a screen for the tube and movable therewith through the pipe, said screen having graduated measuring units, an objective positioned on the opposite side of the screen from the cathode ray tube and in substantially axial alinement therewith.

5. In a cathode-ray pipe-flaw detector for testing a pipe which is temporarily electrically energized, means for passing an electric current longitudinally through the pipe, a cathode ray tube inserted into an open end of the pipe, means for moving the tube longitudinally therethrough, means in association with the tube for rendering the same less sensitive to the magnetic flux in the pipe, and a screen for the tube upon which the electron beam of said tube is projected.

6. In a cathode-ray pipe-flaw detector for testing a pipe which is temporarily electrically energized, means for passing an electric current longitudinally through the pipe, a cathode ray tube inserted into an open end of the pipe, means for moving the tube longitudinally therethrough, means in association with the tube for rendering the same less sensitive to the magnetic flux in the pipe, and means for determining the deflection of the electron stream of the tube while the latter is within the pipe.

7. In a cathode-ray pipe-flaw detector for testing a pipe which is temporarily electrically energized, means for passing an electric current longitudinally through the pipe, a cathode ray tube inserted into an open end of the pipe and movable longitudinally therein with its axis substantially coincident with the axis of the pipe, a screen for the tube and movable therewith through the pipe, and a telescope positioned at the opposite side of the screen from the tube and in axial alinement with the tube and screen, the telescope being secured relative to the latter and movable therewith, the telescope being of sufficient length that the eyepiece thereof is always located at the outside of the pipe to be tested.

8. In a cathode-ray pipe-flaw detector for testing a pipe which is temporarily electrically energized, means for passing an electric current longitudinally through the pipe, a cathode ray tube inserted into an open end of the pipe and movable longitudinally therein with its axis substantially coincident with the axis of the pipe, a screen for the tube and movable therewith through the pipe, and a telescope positioned at the opposite side of the screen from the tube and in axial alinement with the tube and screen, the telescope being secured relative to the latter and movable therewith, the telescope being of sufficient length that the eyepiece thereof is always located at the outside of the pipe to be tested, the telescope having linear graduations to determine the depth of insertion of the tube in the pipe.

9. In a cathode-ray pipe-flaw detector for testing a pipe which is temporarily electrically energized, means for passing an electric current longitudinally through the pipe, a cylindrical insulating casing inserted into the pipe and movable longitudinally therein with its axis substantially coincident with the axis of the pipe, a cathode ray tube secured rigidly and axially within the casing, the tube being provided at one end with a screen, said screen being positioned at the end of the tube nearest the following end of the casing, and a telescope in axial alinement with the casing and having an objective secured to the end of the casing adjacent which the screen is located.

10. In a cathode-ray pipe-flaw detector for testing a pipe which is temporarily electrically energized, means for passing an electric current longitudinally through the pipe, a cylindrical insulating casing inserted into the pipe and movable longitudinally therein with its axis substantially coincident with the axis of the pipe, a cathode ray tube secured rigidly and axially within the casing, the tube being provided at one end with a screen, said screen being positioned at the end of the tube nearest the following end of the casing, and a telescope in axial alinement with the casing and having an objective secured to the end of the casing adjacent which the screen is located, the telescope being of sufficient length that the eyepiece thereof is always located at the outside of the pipe to be tested, the casing enclosing the cathode ray tube and the telescope attached thereto having linear graduations to determine the depth of insertion of the tube into the pipe.

11. The herein described method of determining the location of flaws in a pipe, consisting in electrically energizing the pipe, moving an electron beam longitudinally within the pipe, the normal axis of the beam being substantially parallel to the longitudinal extent of the pipe, and determining the sense of the deflection of the beam from its normal position, caused by the magnetic field in the interior of the pipe.

12. The herein described method of determining the location of flaws in a pipe, consisting in electrically energizing the pipe, moving an electron beam coaxially with and along the axis of the pipe, and determining the sense of the deflection of the beam from its normal position, caused by the magnetic field in the interior of the pipe.

13. In a cathode-ray pipe-flaw detector for testing a pipe, means for passing an electric current longitudinally through the pipe, a cylindrical insulating casing inserted into the pipe and movable longitudinally therein with its axis substantially coincident with the axis of the pipe, a cathode ray tube secured rigidly and axially within the casing, the tube being provided at one end with a screen, said screen being positioned adjacent the following end of the tube, and a telescope in axial alinement with the casing and provided with an objective secured to the end of the casing adjacent which the screen is located, the eyepiece of the telescope being located at all times outside of the pipe to be tested.

14. In a cathode-ray pipe-flaw detector for testing a pipe, means for passing an electric current through the pipe, a cathode ray tube inserted into an open end of the pipe and movable longitudinally therein, with its axis substantially coincident with the axis of the pipe, a screen for the tube and movable therewith through the pipe, and a telescope positioned at the side of the screen opposite the tube and in axial alinement with the tube and screen, the telescope including an eye piece adapted to be located at all times outside of the pipe to be tested and beyond the end thereof receiving the cathode ray tube.

15. In a cathode-ray pipe-flaw detector for testing a pipe, means for passing an electric current through the pipe, a cathode ray tube inserted into an open end of the pipe and movable longitudinally therein, with its axis substantially coincident with the axis of the pipe, a screen for the tube and movable therewith through the pipe, and a telescope positioned at the side of the screen opposite the tube and in axial alinement with the tube and screen, the telescope including an eye piece adapted to be located at all times outside of the pipe to be tested and beyond the end thereof receiving the cathode ray tube, there being provided in connection with the cathode ray tube a scale of linear graduations to determine the depth of insertion of the tube into the pipe.

16. The herein described method of determining the location of flaws in a pipe, consisting in electrically energizing the pipe, moving an electron beam longitudinally within the pipe, the normal axis of the beam being substantially parallel to the longitudinal extent of the pipe, and determining the sense of the deflection of the beam from its normal position at a fixed distance from its source, said deflection being caused by the magnetic field in the interior of the pipe.

17. The herein described method of determining the location of flaws in a pipe, consisting in electrically energizing the pipe, moving an electron beam substantially coaxially with and along the axis of the pipe, and determining the sense of the deflection of the beam from its normal position at a fixed distance from its source, said deflection being caused by the magnetic field in the interior of the pipe.

PAUL L. KIRK.
ROBERT Q. BOYER.